Dec. 25, 1928.
E. M. CROSLAND
1,696,891
MACHINE FOR SHEETING DOUGH
Filed May 22, 1928      2 Sheets-Sheet 1
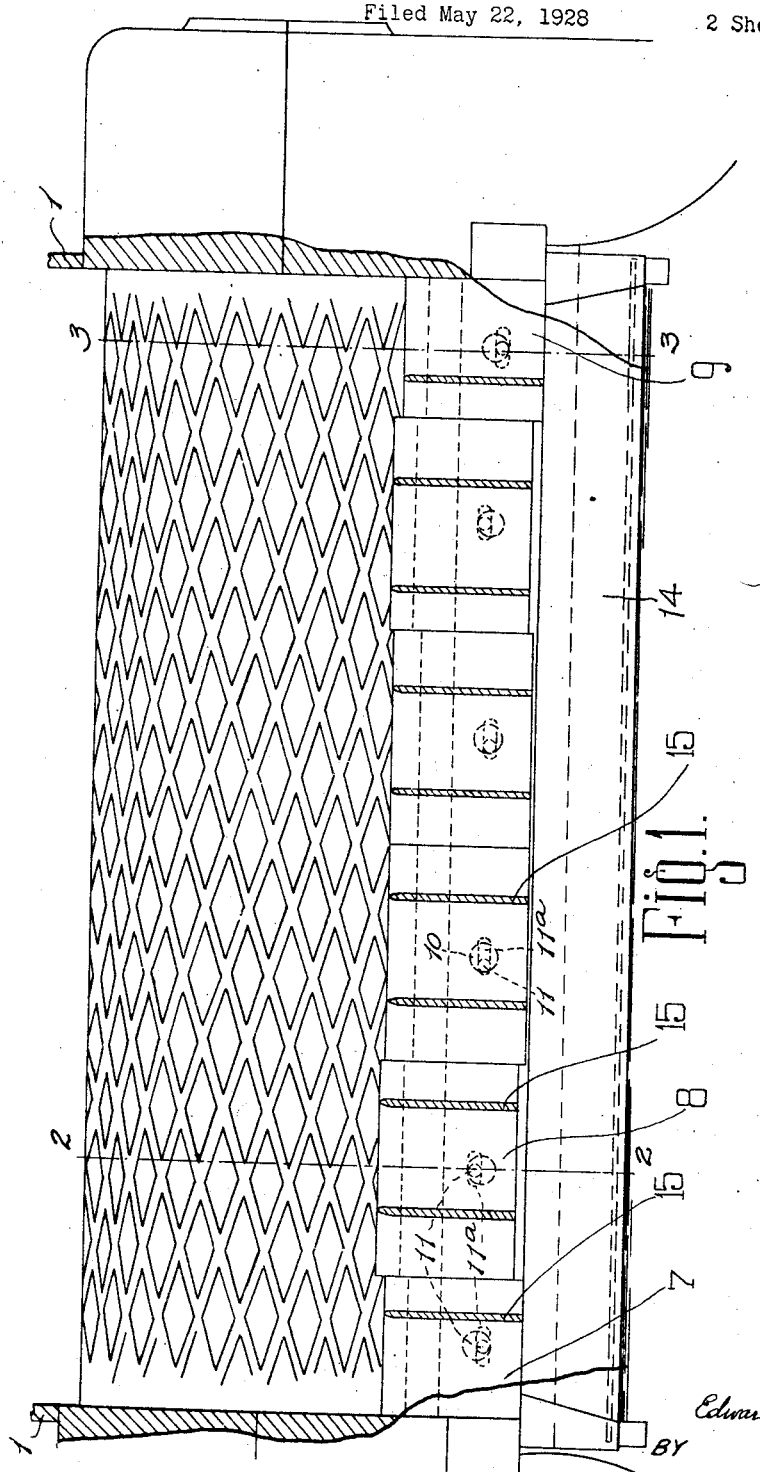
INVENTOR
Edward M. Crosland,
BY
ATTORNEYS.

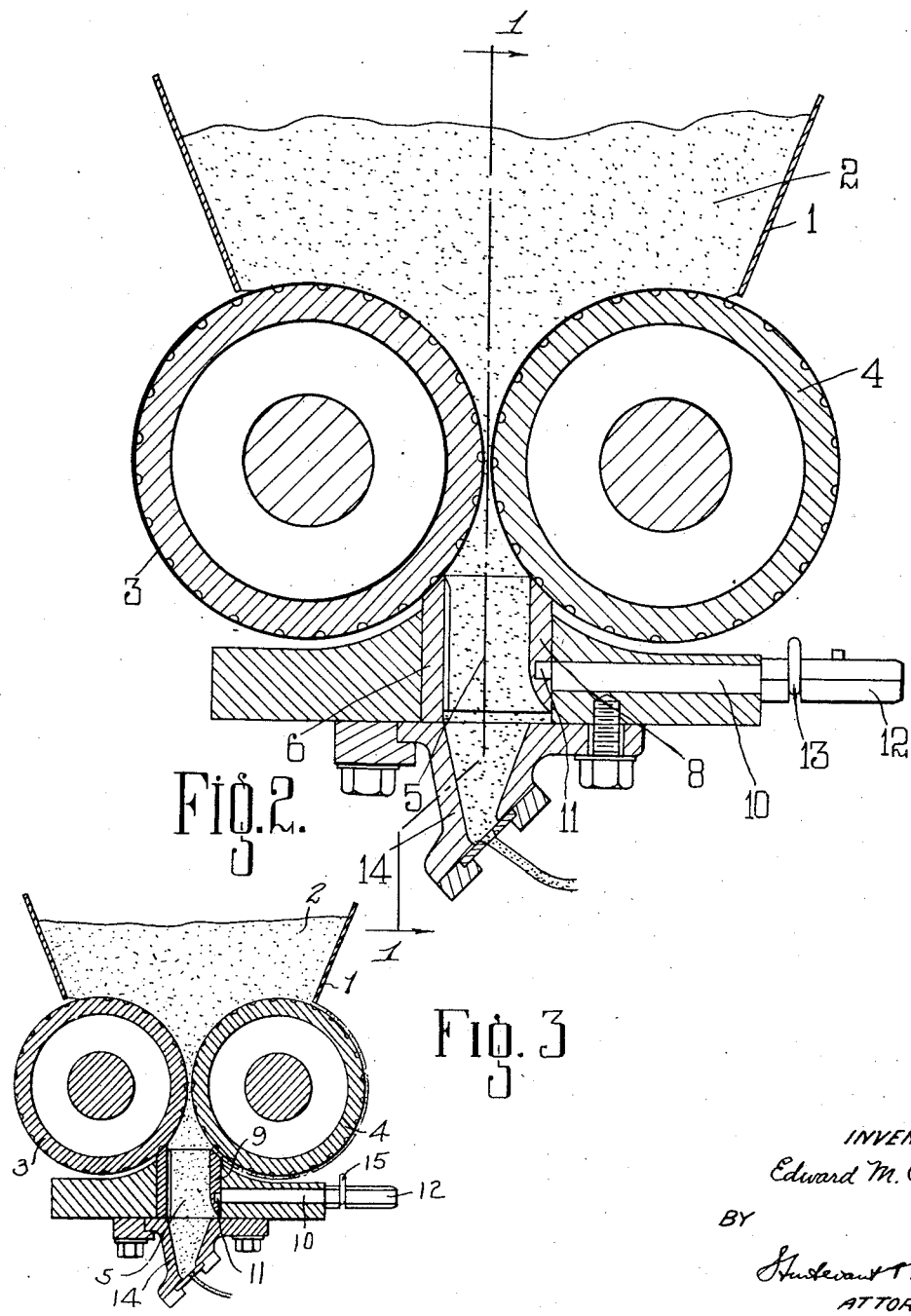

Patented Dec. 25, 1928.

1,696,891

UNITED STATES PATENT OFFICE.

EDWARD MILNER CROSLAND, OF HELSBY, ENGLAND.

MACHINE FOR SHEETING DOUGH.

Application filed May 22, 1928, Serial No. 279,719, and in Great Britain March 29, 1927.

The present invention relates to the manufacture of biscuits and more particularly to machines treating dough or other similar material and where the dough is loaded into a hopper and from there is passed between rollers into a more or less confined space called the compression chamber, the action of the rollers being to give the dough pressure to enable it to be extruded through suitable openings or dies leading from the compression chamber in the form of strips or sheets.

Machines of the above type are well known and may be used for forming sheets of dough suitable for passing on to other machines or they may extrude the dough into strips to be subsequently cut on lengths to form biscuits or further they may extrude through shaped dies when a moving wire may be used to cut short lengths of such dough to form individual biscuits.

The width of a machine of this type is necessarily sufficient to provide a sheet of material wide enough to suit the machine it is feeding or to cover a pan with cut strip portions.

The material in the compression chamber will in the ordinary way flow in the direction of the least resistance, therefore, if a portion of the material is of softer consistency than the rest, the resistance to extrusion is least and more dough will flow towards the dies in the region of this softer material.

In the working of such a machine difficulty has arisen in maintaining an equal delivery of material from the dies throughout the width of the machine, due to variations in the material, variable feed of dough to the rollers and an unequal opportunity for the material to reach the dies.

The object of this invention is to provide means for readily adjusting the pressure in the compression chamber so as to regularize the delivery.

According to the present invention the side of or sides of the compression chamber is formed of a number of individually adjustable sections, so that pressure can be differentially relieved as desired along the length of the compression chamber.

The invention is more particularly described with reference to the accompanying diagrammatic drawings in which:—

Fig. 1 is a view of a machine according to this invention, partly in side elevation and partly in section on line 1—1 of Fig. 2.

Figure 2 is a sectional elevation on the line 2—2 of Figure 1.

Figure 3 is a sectional elevation on the line 3—3 of Figure 1.

In the arrangement taken by way of example, a hopper 1 adapted to be fed with dough 2 is closed at its bottom by means of a pair of dough feed rolls 3, 4, the peripheries of which can be grooved or otherwise patterned. These rolls feed the dough into a compression chamber 5 bounded by a fixed wall 6 on the one side bearing intimately against the surface of the roller 3, and a wall composed of a number of sections 7, 8 . . . 9 extending laterally across the roller 4, and each of which sections can be displaced relatively to the roller 1 to either contact intimately with the surface of this roller, or alternatively, leave a greater or lesser space between the roller and the compression chamber wall. As shown in Figures 1 and 2, the wall section 8 is shown intimately in contact with the roller 4, whilst, as shown in Figures 1 and 3, the sections 9 are shown displaced away from the roller to allow relief of pressure and escape of the dough at these points.

The movable sections are displaceable in or against the direction of feed as shown in the drawings, by turning a spindle 10, having a cranked end 11 engaged in the notch 11ª of the respective section, by means of a handle applied to the ends 12 of these spindles.

A locking catch 13 can be provided holding the spindles 10 in position, so that by moving the catch 13, these can be withdrawn to enable all the sections 7 to be removed when desired.

The dough compression chamber 5 is closed by a feed nozzle 14 of any suitable construction according to the type of biscuit or the like dough ware being made.

To prevent the undue sideways flow of material the compression chambers are divided into a number of cells by the usual expedient of lateral partition walls 15 which may conveniently be mounted on the individually adjustable compression chamber sides 7, 8 . . . 9.

The apparatus therefore, combines a sectional scraper and divisions in the compression chamber, and provides a ready means of adjusting the scraper, and for easy detachment of such scraper for cleaning purposes.

I declare that what I claim is:—

1. A machine for working plastic substances comprising in combination a compression chamber, an extrusion nozzle to receive the plastic substance from said compression chamber, the walls of said chamber comprising a plurality of sections mounted for independent movement, and means to move and fix said sections independently whereby to permit more or less of the plastic substance to escape from said chamber opposite the respective sections without passing to said nozzle so that a uniform extrusion through said nozzle may be accomplished.

2. A machine for working plastic substances, comprising in combination a compression chamber, an extrusion nozzle to receive the plastic substance from said compression chamber, a plurality of partitions in said compression chamber to provide a plurality of separate cells for the plastic substance in its passage to said nozzle, one wall of said chamber comprising a plurality of independent sections, and means to independently adjust said sections whereby to provide openings of variable area for each cell through which a portion of the plastic substance may escape from said cell without passing to the extrusion nozzle.

3. A machine for working plastic substances comprising in combination a container for the plastic substance, a compression chamber, a feeding roller to deliver the plastic substance from said container to said compression chamber and establish compression of said substance in the latter, an extrusion nozzle to receive the material from said compression chamber, one wall of the chamber parallel to the axis of the feeding roller comprising a plurality of independent sections movable toward and from the roller whereby to provide respective openings between the section and roller of variable area through which a portion of said plastic substance may escape from said compression chamber without passing to said extrusion nozzle, and means to fix said sections in adjusted position.

4. A machine as in claim 3, including means to move said sections individually, said moving means including independent detachable spindles for each section carrying each an eccentric pin engaging a respective section, and means to lock the said spindles against detachment.

In witness whereof, I have hereunto signed my name this 12th day of May, 1928.

EDWARD MILNER CROSLAND.